United States Patent [19]

Kramer et al.

[11] Patent Number: 4,979,462
[45] Date of Patent: Dec. 25, 1990

[54] SYSTEMS AND METHODS FOR INDICATING THE LOCATION OF VARIOUS STRUCTURAL MEMBERS IN CONCRETE MEMBERS

[75] Inventors: Donald R. Kramer, Vancouvewa, Oreg.; Eric M. Hayford, Portland, Oreg.

[73] Assignee: MKH³ Enterprises, Inc., Vancouver, Wash.

[21] Appl. No.: 272,131

[22] Filed: Nov. 14, 1988

[51] Int. Cl.⁵ .............................................. E01F 9/02
[52] U.S. Cl. ..................................... 116/209; 52/105; 138/104; 138/105; 248/70; 248/542; 404/43; 405/157
[58] Field of Search ............... 116/200, 209, DIG. 14; 52/103, 105, 220, 221, 678, 684; 138/104, 105, 89; 405/157; 174/37; 220/3.3, 3.4, 3.7, 3.9; 248/70, 542, 679; 404/3, 10, 43

[56] References Cited

U.S. PATENT DOCUMENTS

| | | | |
|---|---|---|---|
| 1,825,049 | 9/1931 | Chamberlain et al. | 52/105 |
| 3,263,577 | 8/1966 | Hiller | 138/105 |
| 3,523,515 | 8/1970 | Brown | 116/DIG. 14 |
| 3,568,455 | 3/1971 | McLaughlin et al. | 138/105 |
| 3,927,637 | 12/1975 | Sammaritano | 116/DIG. 14 |
| 4,738,060 | 4/1988 | Marthaler et al. | 52/103 |
| 4,800,702 | 1/1989 | Wheeler | 52/677 |

*Primary Examiner*—William A. Cuchlinski, Jr.
*Assistant Examiner*—W. Morris Worth
*Attorney, Agent, or Firm*—Marger, Johnson, McCollom & Stolowitz

[57] ABSTRACT

The locating of structural members disposed within the interstices of a concrete member can be accomplished by employing at least one indicator capable of showing the position of the structural member. The indicator also can show the directional location of the support members. The indicator of the present invention generally connects to a post member. This post member provides vertical support for the indicator system. A clamping assembly is attached to the post member and connects the structural member to the indicator system for fixing the location of the structural member. The clamping system can also identify the location of the structural member, and the indicator can then be provided to show the directional line of the structural member. Typically, the post member is sized to a predetermined length so that the longitudinal dimension of the indicator system corresponds to the thickness of the concrete member. In this way, after the concrete is cast, the indicator will be visible at the surfaces of the concrete member.

26 Claims, 2 Drawing Sheets

SYSTEMS AND METHODS FOR INDICATING THE LOCATION OF VARIOUS STRUCTURAL MEMBERS IN CONCRETE MEMBERS

BACKGROUND OF THE INVENTION

This invention relates to systems and methods for indicating the location of structural members, such as pre-tensioned and post tensioned cable, strands and rods, which are disposed within the interstices of concrete members.

Many concrete members, such as concrete slabs or beams, employ high-strength structural members as the means of pre-tensioning or post-tensioning these members for providing strength requirements. In the building construction industry a serious safety concern is posed if these post-tension members are damaged or severed when holes used for anchorage devices or utility lines are drilled into the slab after the concrete has hardened. More specifically, since these tension members are the primary source of strength, these concrete members may fail if the tension members are severed.

The present methods of locating structural members are limited to the use of x-ray photography and/or magnetic induction devices. However, the x-ray photography and magnetic induction devices cannot distinguish between the mild standard concrete steel of concrete reinforcing elements and that of the structural members, respectively. Therefore, severing of the structural members often results. Moreover, the more reliable x-ray photography requires evacuation of the area being exposed during location of structural members for safety reasons.

With respect to other non-analogous uses such as underground utility lines in U.S. Pat. No. 3,523,515 and U.S. Pat. No. 3,927,637, devices have been provided which indicate the depth below ground depth and/or water level of those utility lines. In these devices, the depth can be read by an observer at the ground and/or water level surface.

Therefore, a need exists for a system for easily and accurately indicating the location of structural members located in the interstices of concrete members, in order to avoid the unwanted severing of these structural members when for example, holes are drilled into the concrete member.

SUMMARY OF THE INVENTION

The above-described existing needs have been met by the indicator system of the present invention which is used in locating structural members within a concrete member. Thus, the locating of such structural members is accomplished by employing at least one indicator means capable of showing the position of the structural member in the concrete member. Furthermore, the indicator means also can show the directional location of the support members. The indicator means of the present invention generally connects to a post member. This post member provides vertical support for the indicator system. A clamping assembly is attached to the post member and connects the structural member to the indicator system for fixing the location of the structural member.

The clamping system can also identify the location of the structural member, and the indicator means can then be provided to show the directional line of the structural member. Typically, the post member is sized to a predetermined length so that the longitudinal dimension of the indicator system corresponds to the thickness of the concrete member. In this way, after the concrete is cast, the indicator means will be visible at the surfaces of the concrete member. Depending on the location of the structural member, the clamping assembly is preferably slidably attached to, and movable to a plurality of positions along, the post member. The clamping member can also include coupling means for interlocking engaging with the structural member. A slidable clamping assembly can also be provided which comprises a sleeve section in sliding engagement with the post member. Moreover, the coupling means can further include a slot for facilitating the engagement and disengagement of the structural member therewithin.

In a preferred indicator system, a pair of indicator means are joined to the respective ends of the post member. Each indicator means is preferably positioned so that it will be substantially vertically aligned with the structural member, or in a plane substantially parallel to the longitudinal axis of the coupling means, for fixing the directional line of the structural member. Generally, the indicator means comprises a substantially flat outer surface, and directional indicator means elements pointed in the directional line of the structural member. The indicator means further can also include a holder section for joining the indicator means to the post member, and a fastener slot for joining the indicator system to an underlying concrete form.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
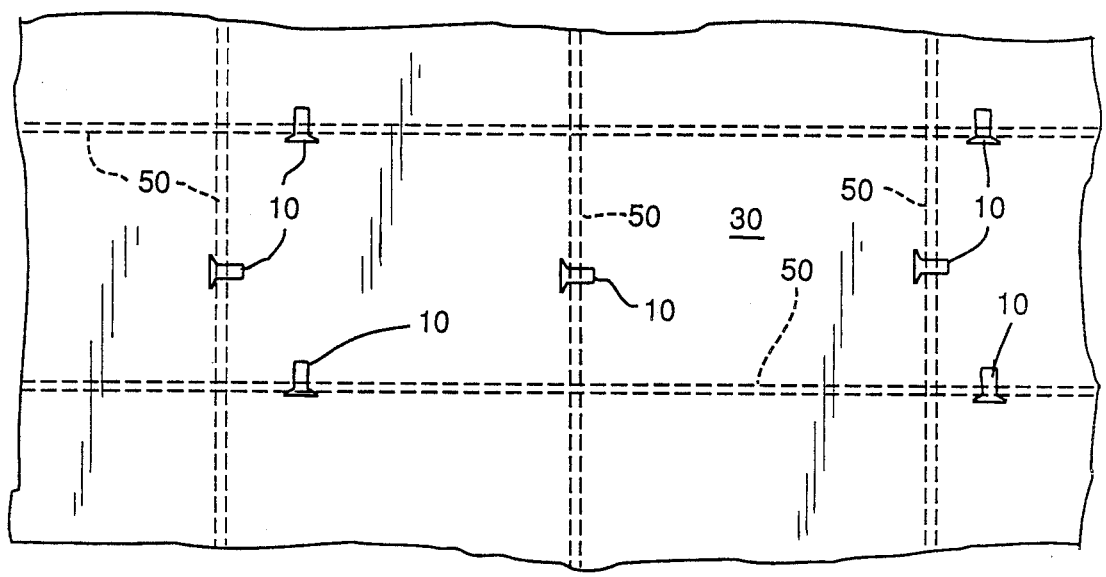
FIG. 1 is an elevated, plan view of a typical concrete member including the structural member indicator systems of the present invention showing the location of the structural members in the interstices of the concrete member.
Figure 2:
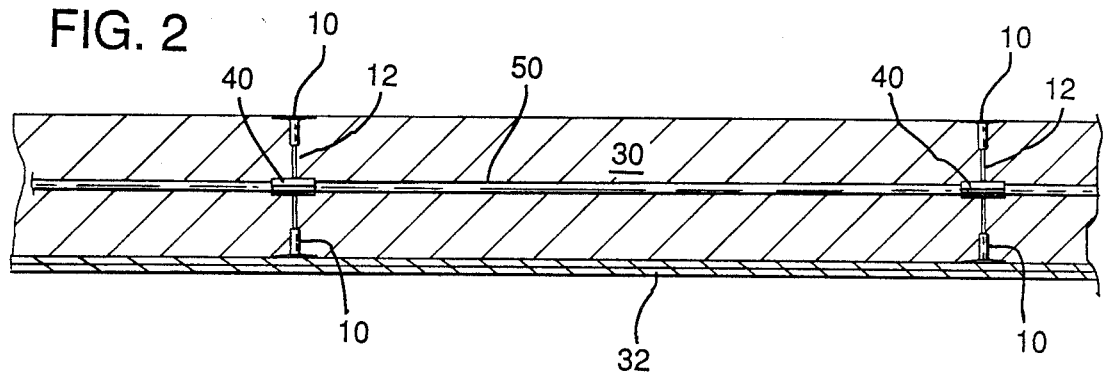
FIG. 2 is an elevated, enlarged sectional view taken along line 2—2 of FIG. 1.
Figure 5:
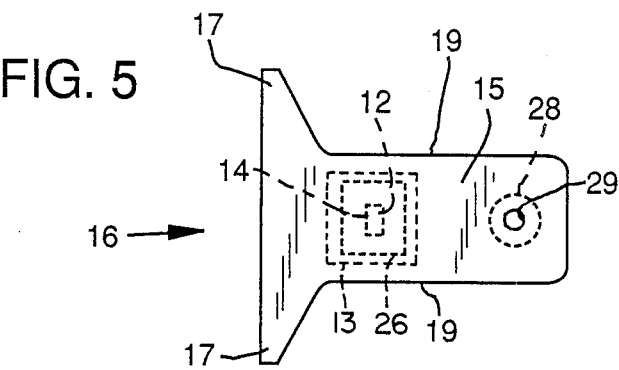
FIG. 5 is an enlarged plan view of the structural member indicator system of FIG. 3.
Figure 3:
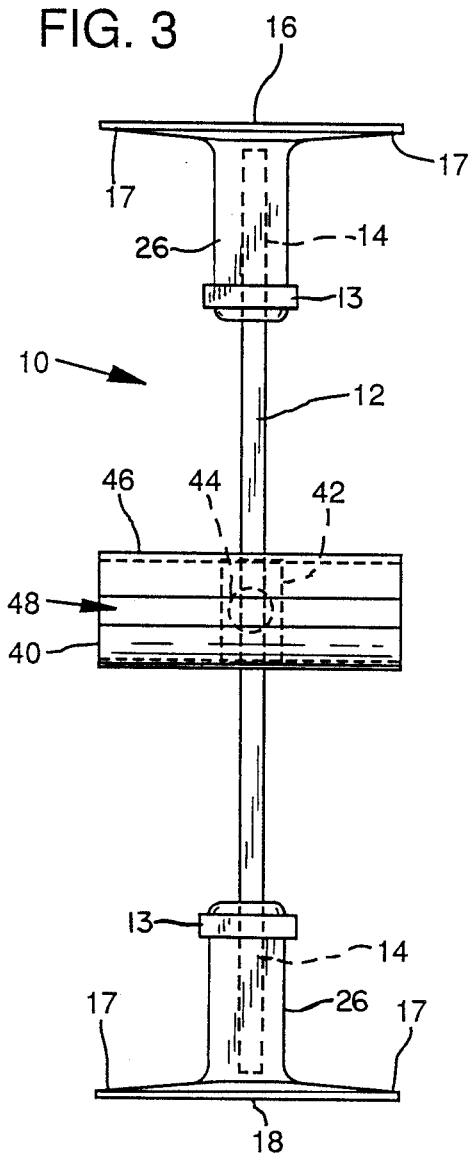
FIG. 3 is an enlarged, front view of the structural member indicator system of the present invention.
Figure 4:
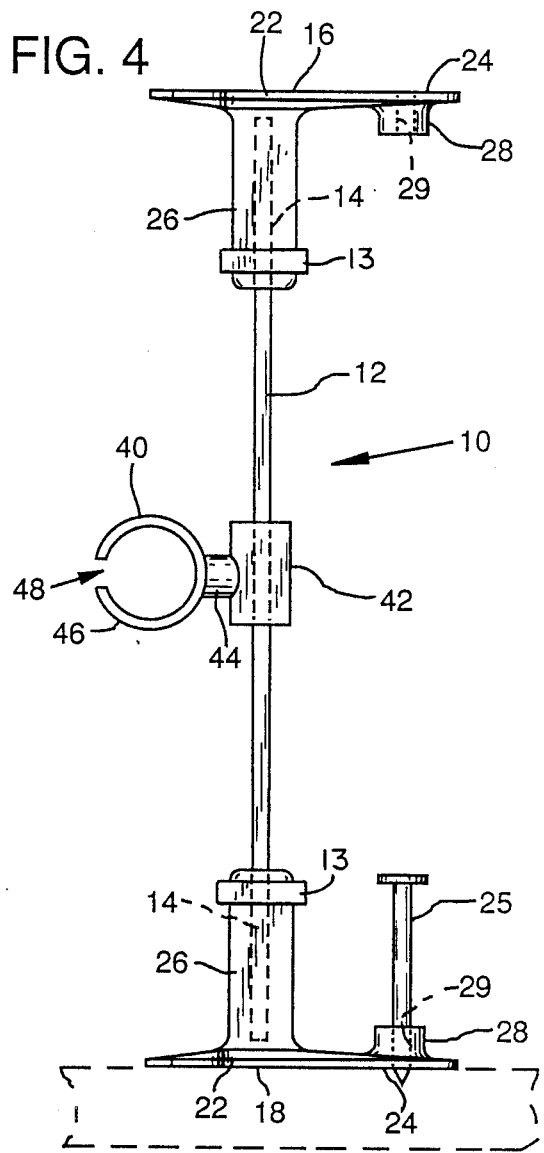
FIG. 4 is an enlarged, side view of the structural member indicator system of FIG. 3.

Referring now to FIGS. 1 and 2, the structural member indicator system of this invention, denoted 10, is disposed within the interstices of a concrete member 30, in this case a concrete slab. Indicator system 10 is more specifically depicted in FIGS. 3–5, and comprises a post member 12 which supportedly connects at its respective ends 14 to top and bottom indicator means 16 and 18, respectively. Indicator means 16 includes a base portion 22 having a substantially flat outer portion 24 and including a holder portion 26 to which post member 12 is joined. A retaining collar 13 is joined about holder 26 for maintaining indicator system 10 in position within concrete member 30. The indicator means 16, which is generally elongated in shape, comprises a substantially rectangular support portion 15 and a pair of pointed directional indicators 17 extending from the elongate edges 19 at one end of indicator means 16. Typically, one of the flat surfaces 24 will rest on a complementary substantially flat underlying surface, typically a concrete form 32. Flat surface 24 is generally in a horizontal plane during use. Therefore, post member 12 will preferably extend at right angles to the flat surfaces and in a substantially vertical plane. Slot 28 is provided in base sections 16 and 18 having a central aperture 29 which passes entirely through base portion 22 and surface 24 (see FIG. 5). Fastening means 25, in the form of a nail in FIG. 4, pass within aperture 29 and attach the indicator system 10 to a concrete form 32 (see FIG. 2).

A clamping assembly 40 is connected for sliding engagement via sleeve portion 42 to post member 12 between indicator means 16 and 18. Coupling means 46, preferably in the form of a snap clamp, is joined to sleeve portion 42 by arm portion 44. A slot 48 is disposed within the coupling means 46 for facilitating the engagement and disengagement of cable 50 from within the coupling means. The coupling means extend in a longitudinal plane in substantially the same direction as the pointed directional indicators 17 which are shaped to indicate the direction that the line of the cable extends. Therefore, the pointed directional indicators 17 will provide a directional marker for locating the cable 50 and for indicating the direction in which the cable extends within the coupling means 46.

Preferably, the indicator system 10 is fabricated from a polymeric or metal material, depending on cost and use requirements of a given installation.

In operation, structural members 50 are first installed in position over the construction forms 32. Each clamp assembly 40 is then placed onto each of the cables 50 by moving slot 48 the cable, and then into coupling means 46. Next, post member 12 is inserted through sleeve 42. Previously, post member 12 was precut to a size equal to the predetermined thickness of the concrete member 30. The bottom indicator means 18 is attached to the bottom of post member 12 by inserting lower end 14 into holder portion 26 of the top indicator. The post member is then aligned vertically and bottom indicator 18 is joined to the form 32 by driving nail 25 thereinto. The top indicator means 16 is attached to the top of post member 12 by inserting the upper end 14 into holder portion 26 of the bottom indicator. The concrete member 30 is then cast. When the concrete member 30 has set, the forms are removed and the indicator system 10 remains in place and in alignment with the outer surface of the concrete member so that indicator means 16 and 18 depict the location and directional location of the cables 50.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An indicator system for locating the position of structural members within the interstices of a concrete member, which comprises:
   an elongate member for providing a connector for said indicator system within the interstices of said concrete member;
   at least one indicator means joined to at least one end of said elongate member for showing the location of said structural members within the interstices of said concrete member, the indicator means being visible at the surface of said concrete member; and
   means attached to said elongate member for connecting said elongate member to said structural members for fixing the position of said structural members within the interstices of said concrete member.

2. The indicator system of claim 1, wherein indicator means further shows a directional location of said structural members.

3. The indicator system of claim 1, wherein the elongate member is sized to a predetermined length so that the longitudinal dimension of said indicator system corresponds to the thickness of said concrete member.

4. The indicator system of claim 1, wherein said attached means is slidably attached to, and movable to a plurality of positions along, said elongate member.

5. The indicator system of claim 1, wherein indicator means are joined to respective ends of said elongate member.

6. The indicator system of claim 1, wherein said indicator means is positioned so that it will be substantially vertically aligned with said structural members.

7. The indicator system of claim 1, wherein said attached means includes coupling means for interlocking engagement with said connected structural members.

8. The indicator system of claim 7, wherein said indicator means is positioned in a plane substantially parallel to the longitudinal axial of said coupling means.

9. The indicator system of claim 1, wherein said indicator means comprises a substantially flat visible outer surface.

10. The indicator system of claim 1, wherein said indicator means includes directional indicator elements pointed in a directional location of said structural members.

11. The indicator system of claim 4, wherein said slidable attached means comprises a sleeve section in sliding engagement with said elongate member.

12. The indicator system of claim 7, wherein said coupling means further includes a slot for facilitating the engagement and disengagement of said structural members within said coupling means.

13. The indicator system of claim 1, wherein said indicator means further includes a holder section for joining said indicator means to said elongate member.

14. The indicator system of claim 1, wherein said indicator means includes a fastener slot for joining said indicator system to an underlying concrete form.

15. A method for producing a concrete member including structural members within the interstices of said concrete member which are visibly locatable at the surface of said concrete member, which includes the steps of:
   installing said structural members;
   providing at least one indicator system for each of each of said structural members, each of said indicator systems comprising:
   an elongate member for providing a connector for said indicator system within the interstices of said concrete member;
   at least one indicator means joined to at least one end of said elongate member for showing the location of said structural members within the interstices of said concrete member, the indicator means being visible at the surface of said concrete member;
   means attached to said elongate member for connecting said elongate member to said structural members for fixing the position of said structural members within the interstices of said concrete member;

attaching at least one indicator system to each of said structural members and;

casting said concrete member so that the indicator system is within the interstices of said concrete member, and are visible at the surface of said concrete member, thereby the position of said structural members being readily locatable.

16. The method of claim 15, which further includes the step of providing an indicator system which shows the directional location of said structural members.

17. The method of claim 15, wherein a plurality of indicator systems are connected to each said structural member.

18. The method of claim 15, which further includes the step of positioning each said indicator system so that it is substantially vertically aligned with said structural member.

19. The method of claim 15, which further includes the steps, of prior to connecting each said indicator system, providing a construction form, and joining each said indicator system to said construction form.

20. The method of claim 15, which further includes the steps of, prior to attaching each said indicator system, sizing said connector member to a predetermined length so that the longitudinal dimension of said connector member substantially corresponds to the thickness of said concrete member.

21. The method of claim 15, which further includes the step of, prior to attaching each said indicator system, sizing said connector member to a predetermined length so that said indicator means will be visible at the surface of said concrete member.

22. An indicator system for locating the position of structural members within the interstices of a concrete member, which comprises:

a member sized to a predetermined length so that the longitudinal dimension of said indicator system corresponds to the thickness of said concrete member for providing a connector for said indicator system within the interstices of said concrete member;

at least one indicator means joined to at least one end of said connector member for showing the location of said structural members, the indicator means being visible at the surface of said concrete member; and means attached to said connector member for joining said member to said structural members for fixing the position of said structural members within the interstices of said concrete member.

23. An indicator system for locating the position of structural members within the interstices of a concrete member, which comprises:

a member for providing a connector means for said indicator system within the interstices of said concrete member;

at least one indicator means joined to at least one end of said connector means for showing the location of said structural members, the indicator means being visible at the surface of said concrete member; and means slidably attached to, and movable to a plurality of positions along, said connector means for joining said connector means to said structural members for fixing the position of said structural members within the interstices of said concrete member.

24. An indicator system for locating the position of structural members within the interstices of a concrete member, which comprises:

a member for providing a connector for said indicator system within the interstices of said concrete member;

at least one indicator means joined to at least one end of said connector member for showing the location of said structural members, the indicator means being visible at the surface of said concrete member; and means attached to said connector member for joining said connector member to said structural members for fixing the position of said structural members within the interstices of said concrete member, said attachment means including coupling means for interlocking engagement with said structural members.

25. The indicator system of claim 24 wherein said indicator means is positioned in a plane substantially parallel to the longitudinal axial of said coupling means.

26. An indicator system for locating the position of structural members within the interstices of a concrete member, which comprises:

a member sized to a predetermined length so that indicator means will be visible at the surface of said concrete member, for providing a connector for said indicator system within the interstices of said concrete member;

at least one indicator means joined to at least one end of said connector member for showing the location of said structural members, the indicator means being visible at the surface of said concrete member; and means attached to said connector member for joining said member to said structural members for fixing the position of said structural members within the interstices of said concrete member.

* * * * *